April 11, 1950          B. T. HOWES          2,503,822
SPEED CONTROL FOR AXIAL FLOW FANS
Filed Nov. 23, 1945          3 Sheets-Sheet 1
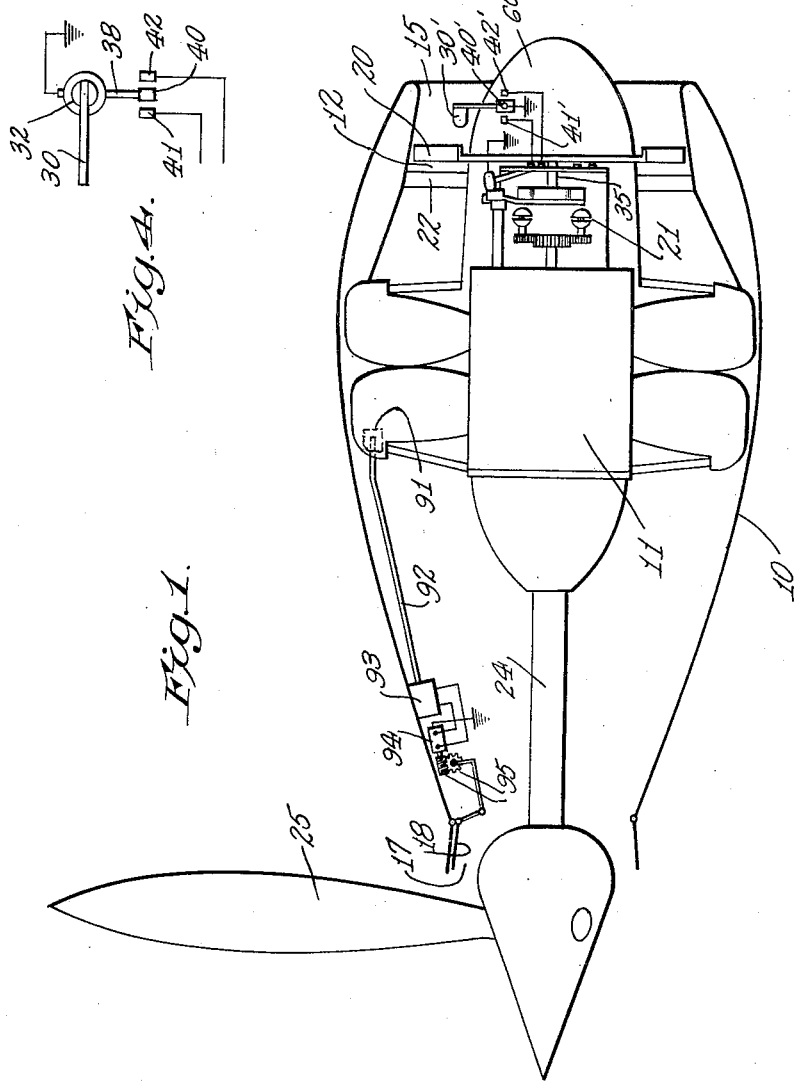
INVENTOR.
Benjamin T. Howes
BY
Ernest D. Given
ATTORNEY April 11, 1950          B. T. HOWES          2,503,822
SPEED CONTROL FOR AXIAL FLOW FANS
Filed Nov. 23, 1945          3 Sheets-Sheet 2
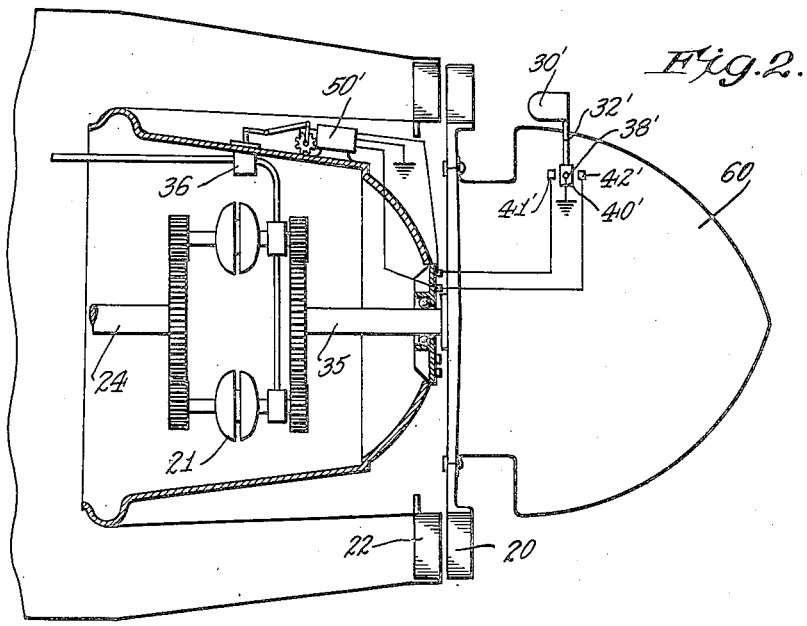
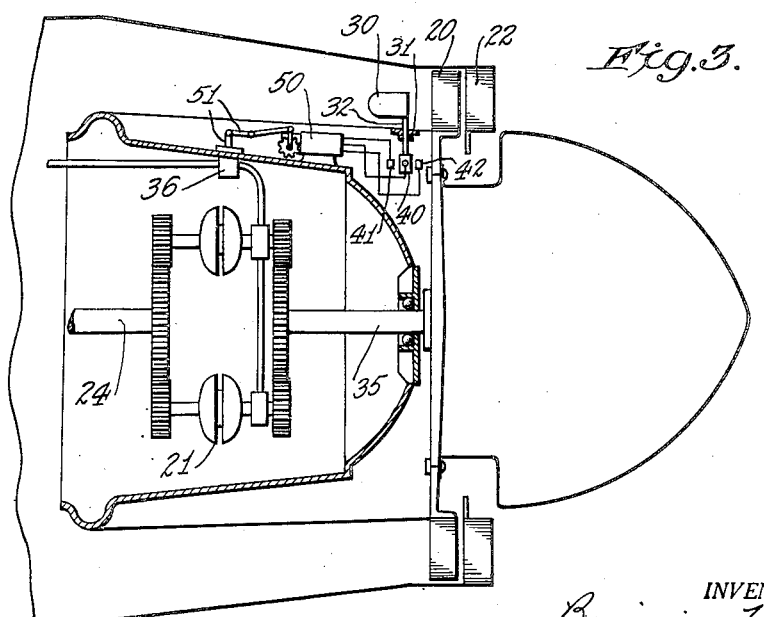
INVENTOR.
Benjamin T. Howes
BY Ernest D. Gurn
ATTORNEY INVENTOR.
Benjamin T. Howes
BY
Ernest D. Given
ATTORNEY Patented Apr. 11, 1950

2,503,822

UNITED STATES PATENT OFFICE 2,503,822

SPEED CONTROL FOR AXIAL FLOW FANS

Benjamin T. Howes, Hartford, Conn., assignor to United Aircraft Corporation, East Hartford, Conn., a corporation of Delaware Application November 23, 1945, Serial No. 630,413

7 Claims. (Cl. 170—160.13)

This invention relates to axial flow fans employed on aircraft and has for its principal object the provision of means which will enable the fan to operate at maximum efficiency. The term "fan" as here employed includes propellers, as well as the fans employed for cooling airplane engines. To operate these fans at greatest efficiency they must be run at a fixed ratio of $Q/ND$ or $V/ND$, where $Q$ represents the quantity of air delivered to the fan, $V$ is the air velocity, $N$ is the fan speed and $D$ is the fan diameter. This ratio is a function of the angle of air flow with respect to the fan, and the best efficiency is obtained at a predetermined angle of air flow. This predetermined angle is either the angle of attack or the wake angle, since a predetermined angle of attack implies a predetermined wake angle. It is, therefore, one of the principal objects of this invention to provide means for indicating the angle of attack or the wake angle to serve as a guide for controlling the fan to cause it to operate at maximum efficiency.

Another object of this invention is to provide means responsive to deviation from the predetermined angle of air flow for automatically controlling the fan to cause it to operate at maximum efficiency.

Still another object of this invention is to provide means responsive to deviation from the predetermined wake angle or angle of attack for automatically controlling the speed of the fan to cause it to operate at maximum efficiency.

Another object of this invention is to provide means responsive to deviation from the predetermined wake angle or angle of attack for automatically controlling the pitch of the fan blades to cause the fan to operate at maximum efficiency.

Further objects and advantages of this invention will become apparent in the following detailed description thereof.

In the accompanying drawings:

Figure 1 is a vertical section, partly diagrammatic, through an aircraft, showing one form of this invention applied thereto;

Fig. 2 is an enlarged view of the right hand portion of Fig. 1;

Fig. 3 is a view similar to Fig. 2 showing another form of this invention;

Fig. 4 is a plan view of a detail employed in Figs. 1, 2 and 3, showing the electrical control contacts;

Figure 5:
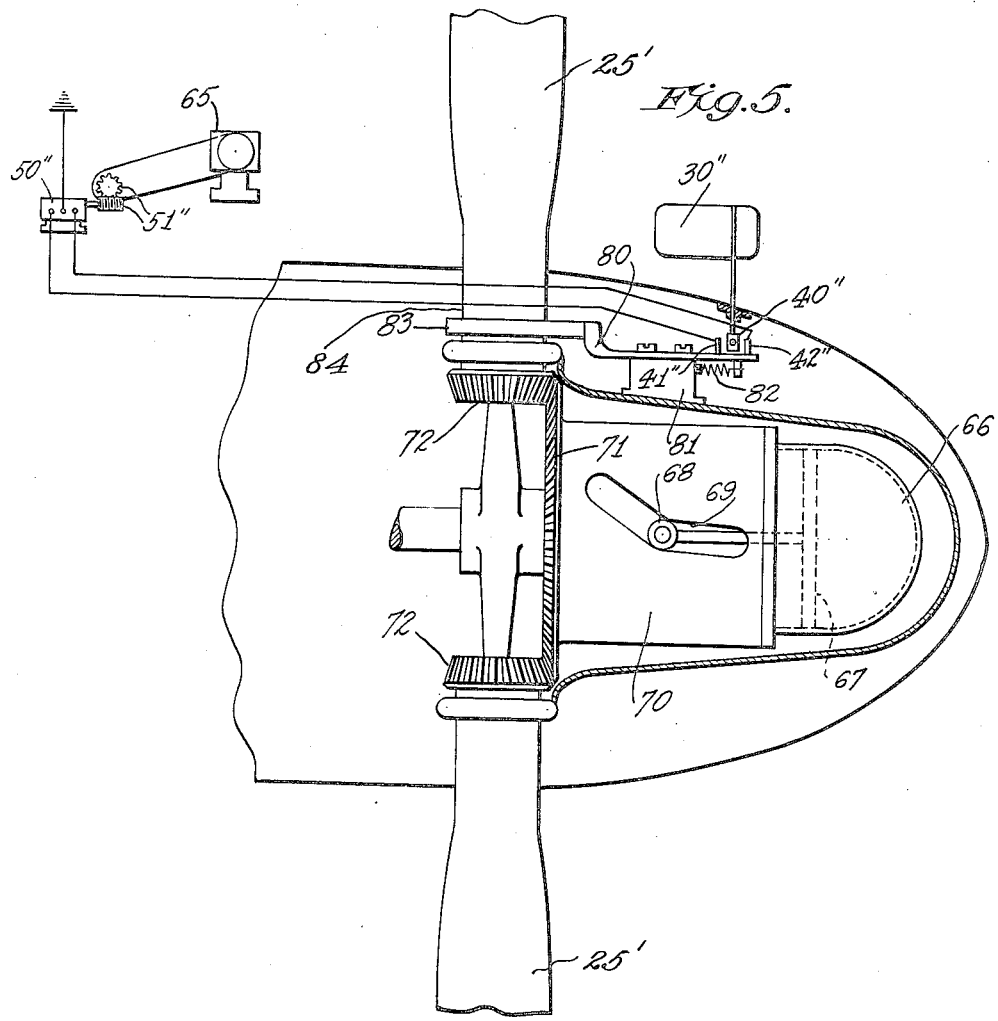
Fig. 5 is a section through an aircraft showing this invention applied to the control of the pitch of propeller blades.
Figure 6:
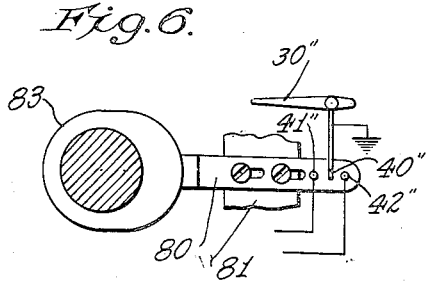
Fig. 6 is a plan view of a detail of Fig. 5.

Referring to Fig. 1 of the drawings, there is shown an aircraft having a body 10 spaced from an engine 11 and open at the front so as to provide a cooling passage 12 and an inlet 15 for cooling air. The air passes over the engine and discharges through rear exit gills 17 controlled by flaps 18. Since engine cooling can sometimes be provided more efficiently by use of a fan than by induced flow provided by movement of the aircraft through the air alone, a fan 20 driven from engine 11, in this case, through a variable speed fluid coupling 21, is provided. Contravanes 22 may be employed either upstream or downstream of the fan, the latter being illustrated. The engine drives propeller 25 through shaft 24.

This invention may be applied to the fan 20 or to the propeller 25' (Fig. 5), or both, and it may control the speed or the blade pitch. Figs. 1 to 4 show the invention applied to controlling the speed of the fan, while Fig. 5 shows its application to controlling the pitch of the propeller blades.

As stated in the introduction hereto, there is an optimum value of $Q/ND$ ratio for maximum fan efficiency and this ratio is a function of angle of attack and, hence, of wake angle. There is, therefore, a predetermined angle of attack or wake angle which represents maximum fan operating efficiency. This invention provides (1) means for indicating the attack or wake angle so that an operator may change the fan speed or blade pitch to restore the fan to maximum operating condition, in which condition the indicating means will indicate the predetermined optimum angle; and (2) means controlled by the angle indicating means for automatically changing the fan operating conditions to restore the indicating means to predetermined optimum angle.

Referring first to Fig. 3 there is shown a vane 30 pivotally mounted on a fixed support 31 for movement about an axis or shaft 32 normal to the axis of rotation of the fan. The vane is mounted, in this case, to the rear of the fan and thus will assume the wake angle of the air stream leaving the fan. Any suitable fixed scale (not shown) may be provided in cooperative relation to the van for indicating the wake angle, and if this angle deviates from a predetermined optimum angle, an operator can change the operating conditions of the fan to the degree necessary to restore the wake angle to optimum. This indicates that the fan is again operating at maximum efficiency.

For changing the operating conditions of the fan, an operator may change the fan speed or the blade pitch. Fig. 3 discloses means for changing the fan speed. This means comprises a fluid coupling indicated generally at 21, between the engine shaft 24 and fan shaft 35. The speed of the fan is controlled by regulating the amount of fluid delivered to the coupling through valve 36. By controlling the degree of opening of this valve, an operator can vary the fan speed as desired to restore the wake angle to the predetermined optimum angle.

Instead of merely indicating the wake angle by the position of vane 30 with respect to a fixed scale, means may be provided whereby the fan speed will be controlled automatically in response to deviations of the wake angle from the predetermined optimum angle. For this purpose the vane 30 may be provided with an arm 38 (see Fig. 4) extending at an angle to shaft or stem 32 which supports the vane. Arm 38 carries at its end an electrical contact 40 which, when the vane 30 indicates the predetermined optimum wake angle, lies between and spaced from, contacts 41 and 42 on the fixed support. When the wake angle deviates from the predetermined angle, contact 40 engages contact 41 or 42 to close the circuit in one direction or the other through a reversible motor 50 which is operatively connected through a suitable linkage 51 to the valve 36 to open or close the same and, hence, increase or decrease the speed of the fan. The circuits are so arranged that the direction of fan speed change will vary the wake angle so as to restore contact 40 to its position between, and spaced from, contacts 41 and 42. Thus, the fan speed is automatically controlled by the wake angle indicator to make the necessary correction so that the fan again operates at maximum efficiency.

While the invention has been described above in connection with the wake angle indicating means, it is apparent from the discussion of the problem hereinbefore that the control may be exercised also by an angle of attack indicator, since these angles bear a fixed relation to each other. In the case of an angle of attack indicator, as disclosed in Figs. 1 and 2, the vane 30' must be supported in front of the fan and must rotate therewith. Therefore, vane 30' is shown as supported on a spinner 60 which rotates with the fan. A stem 32' which supports the vane carries an arm 38' which in turn carries a contact 40' which, when the vane 30' indicates the predetermined optimum angle of attack, lies between, and spaced from, contacts 41' and 42' on the spinner 60. When the angle of attack deviates from the predetermined angle, contact 40' engages contact 41' or 42' to close the circuit in one direction or the other through reversible motor 50' to open or close valve 36 and increase or decrease the speed of the fan until the angle of attack is changed in a direction to bring contact 40' against between, and spaced from, contacts 41' and 42'. The electrical connections between contacts 41' and 42' to the motor 50' may be made through slip rings rotating with the fan and brushes engaging the slip rings.

The control described hereinbefore can be used to best advantage in installations where the fan has greater pressure capacity than is required under level flight conditions at some high altitude. Under this condition the flight ram due to forward velocity would produce a pressure in addition to the fan pressure rise which would be greater than required for engine cooling. The excess pressure would then be turned into velocity at the exit gill 17 and would form a propulsive jet. The exit gill is controlled in the usual manner from a thermostatic unit 91 at the engine which operates through a fluid connection 92 a switch mechanism 93 which controls a reversible motor 94 connected through suitable gearing 95 to the flaps 18. The fan capacity would normally be designed to run at maximum efficiency and supply the required pressure rise for maximum exit gill efficiency at a particular altitude, engine output and flight velocity.

It has been stated hereinbefore that for maximum operating efficiency in accordance with the predetermined wake angle or angle of attack either the speed of the fan or the blade pitch may be varied. In Figs. 1 to 4 there have been disclosed means for varying the speed of an engine cooling fan. In Fig. 5 there are disclosed means for varying the blade pitch of a fan, in this case, a propeller, in response to the same controls, i. e., the wake angle or angle of attack as determined by the vane 30''. The vane 30'' has movable therewith a contact 40'' which, when the propeller is operating at maximum efficiency and the vane indicates the predetermined optimum angle, lies between, and spaced from, contacts 41'' and 42''. Any deviation from this angle will close the circuit through reversible motor 50'' which operates through suitable gearing 51'' a hydraulic propeller pitch governor 65 which controls the flow of fluid to cylinder 66 and piston 67 therein. The movement of the piston operates through pin 68 and cam slot 69 to rotate drum 70 and gear 71 carried thereby. Gear 71 meshes with gears 72 carried by the propeller blades, whereby actuation of gear 71 will change the pitch of the propeller blades in such direction as to return contact 40'' to its position between and out of engagement with contacts 41'' and 42''. In this position, the propeller is operating at maximum efficiency.

The solution described above, consisting in varying the blade pitch, introduces another problem resulting from the fact that the optimum angle of attack changes with the pitch. A single fixed position of contacts 41'' and 42'' would define the optimum angle for only one blade pitch and it is, therefore, necessary to vary the position of the contacts to define corrected optimum angle for each new blade pitch. For this purpose, the contacts 41'' and 42'' are mounted on a bar 80 which is slidably mounted in a support 81 for sliding movement in respect thereto in a direction substantially the same as the direction of movement of the contact 40''. The bar 80 is moved in response to change in blade pitch by causing the bar to be pressed by spring 82 against the periphery of a cam 83 fixed to the blade hub 84. As the bar 80 is moved in one direction or the other, the position of contacts 41'' and 42'' is changed with respect to contact 40'' to change the optimum angle. The cam is cut to introduce the proper correction in the optimum angle for each blade pitch setting.

In accordance with the patent statutes, the preferred embodiment of the invention has been described, but it will be understood that changes may be made within the scope of the appended claims which define the invention.

What is claimed is:

1. In an aircraft, an axial flow fan having a variable operating characteristic, means including a reversible motor for varying the operating characteristic, means responsive to angle of air flow with respect to the fan, and means whereby said responsive means actuates said characteristic varying means when the angle of air flow deviates from a predetermined optimum angle, said last named means comprising a set of contacts in the motor circuit and positioned to define the optimum angle, a contact in the motor circuits carried by said responsive means and adapted to engage one or the other contact of said set upon variation of the angle of air flow from the optimum angle to energize said motor in one direction or the other, the energization of the motor being in a direction to vary the operating characteristic to restore the optimum angle.

2. In an aircraft, an axial flow fan having blades, means including a reversible motor for varying the pitch of the blades, means responsive to angle of flow with respect to the blades, and means whereby said responsive means actuates said pitch varying means when the angle of air flow deviates from a predetermined optimum angle, said last named means comprising a set of contacts in the motor circuits and positioned to define the optimum angle, means for movably supporting the set of contacts, a contact in the motor circuits carried by said responsive means and adapted to engage one or the other contact of said set upon variation of the angle of air flow from the optimum angle to energize said motor in one direction or the other, the energization of the motor being in a direction to vary the blade pitch to restore the optimum angle, and a cam carried by the blade and adapted to engage the means supporting the set of contacts to vary the position of said contacts as a function of blade pitch.

3. An axial flow fan in accordance with claim 1, wherein said means responsive to angle of air flow with respect to the fan is located to be responsive to the wake angle of air flow.

4. An axial flow fan in accordance with claim 1, wherein said means responsive to angle of air flow with respect to the fan is a means responsive to the angle of attack of the air flow, and wherein this means is mounted for rotation with said axial flow fan.

5. An axial flow fan in accordance with claim 1, wherein said variable operating characteristic of the fan is the speed of rotation thereof.

6. An axial flow fan in accordance with claim 1, wherein said fan has a plurality of fan blades, each of which is variable in pitch, and wherein said variable operating characteristic of the fan is the variable pitch of said blades, said reversible motor acting simultaneously to vary the pitch of all said blades.

7. An axial flow fan in accordance with claim 1, wherein said fan has a plurality of fan blades, each of which is variable as to pitch, wherein said variable operating characteristic is the variable pitch of said blades, said reversible motor operated simultaneously to vary the pitch of all said blades, and including in addition, means for varying said optimum angle as a function of blade pitch.

BENJAMIN T. HOWES.

REFERENCES CITED

The following references are of record in the file of this patent:

UNITED STATES PATENTS

| Number | Name | Date |
| --- | --- | --- |
| 1,779,186 | Pavlecka | Oct. 21, 1930 |
| 1,780,431 | Carroll | Nov. 4, 1930 |
| 1,963,664 | Lambert | June 19, 1934 |
| 2,133,253 | Myers | Oct. 11, 1938 |
| 2,326,308 | Reissner | Aug. 10, 1943 |
| 2,347,104 | Hoover | Apr. 18, 1944 |
| 2,350,383 | Bebinger | June 6, 1944 |
| 2,382,535 | Bauer | Aug. 14, 1945 |
| 2,426,635 | Mercier | Sept. 2, 1947 |

FOREIGN PATENTS

| Number | Country | Date |
| --- | --- | --- |
| 847,020 | France | June 19, 1939 |